United States Patent

[11] 3,587,318

| [72] | Inventors | Pierre Belugou<br>Paris;<br>Jean De Chaumont, Les Ageux Par Pont-Ste Maxence, France |
|---|---|---|
| [21] | Appl. No. | 826,326 |
| [22] | Filed | May 21, 1969 |
| [45] | Patented | June 28, 1971 |
| [32] | Priority | May 21, 1968 |
| [33] | | France |
| [31] | | 152,665 |
| [73] | Assignee | Charbonnages De France, Paris, France. |

[54] METHOD AND APPARATUS FOR MEASUREMENT BY DETERMINING THE TEMPERATURE OF A THERMOSENSITIVE ELEMENT HEATED BY THE JOULE EFFECT
14 Claims, 6 Drawing Figs.

[52] U.S. Cl. .................................................. 73/362, 73/204
[51] Int. Cl. .................................................. G01k 7/24, G01k 13/02, G01p 5/12
[50] Field of Search ........................................... 73/204, 362 (R), 362 (GP.)

[56] References Cited
UNITED STATES PATENTS

| 2,650,496 | 9/1953 | Middleton et al. | 73/204 |
| 3,096,650 | 7/1963 | Lowenstein et al. | 73/362(R)X |
| 3,296,866 | 1/1967 | Zenmon Abe et al. | 73/362(R) |
| 3,345,874 | 10/1967 | Carniol et al. | 73/362(CR) |
| 3,398,579 | 8/1968 | Carniol et al. | 73/342 |

*Primary Examiner*—Louis R. Prince
*Assistant Examiner*—Frederick Shoon
*Attorney*—Karl W. Flocks ABSTRACT: Method and apparatus for measurement by determining the temperature of a thermosensitive element heated by the Joule effect utilizing a compensating thermosensitive element and a thermosensitive detector element with the compensating element continuously supplied with a direct current while the detector element is supplied with square direct current waves having an intensity regulated to a value greater than that of the intensity of the direct current supplying said compensating element. The method involves regulating the duration of the square direct current waves so that the resistance of the detector element has the same value as that of the compensating element whereby the value of one of the variable characteristics of the square direct current waves may be taken as the representative value of the characteristic quantity to be measured.

METHOD AND APPARATUS FOR MEASUREMENT BY DETERMINING THE TEMPERATURE OF A THERMOSENSITIVE ELEMENT HEATED BY THE JOULE EFFECT

The present invention relates to methods and apparatus for measurement, in which the temperature of a thermosensitive detector element heated by the Joule effect and immersed in a medium is a function of the value of one of the characteristic quantities of the medium, the temperature of the thermosensitive element being determined by measuring its resistance.

There are known at the present time a number of measuring instruments which determine the temperature of a thermosensitive element, the operation of which is based on the above-mentioned property.

Some of these apply the principle of measurement of the value of the resistance of the thermosensitive detector element when the temperature of the thermosensitive element increases as a function of the value of the characteristic quantity to be measured. This is the case with fire-damp meters and explosion-meters with catalytic combustion on or in the vicinity of a filament; this is also the case with thermometers.

Other instruments make use of the principle of measurement of the value of the resistance of the thermosensitive detector element when, according to the value of the characteristic quantity to be measured, the heat dissipation of the detector element varies. This is the case with apparatus for dosing gas by variation of the heat conductivity of the medium containing the gas to be dosed. This is also the case with hot-wire anemometers and thermistance anemometers.

It is known that in these instruments it is necessary to provide a compensation against the influence which may be exerted by other characteristic quantities of the medium, which behave like parasitic parameters, the influence of which can vary with time and according to the place of use of the apparatus.

Thus, in order to ensure the best automatic compensation with respect to the ambient temperature of the medium under examination, it has already been proposed to employ a second thermosensitive element, known as a compensating element or pilot element, identical with the detector element, heated by the Joule effect to a certain temperature, and to modify the heating circuit of the detector element in such manner that its temperature remains equal to that of the compensating element, or, which amounts to the same thing, in such manner that the resistance of the detector element remains equal to that of the compensating element, the measurement of the value of the quantity to be measured being then reduced to the measurement of one of the variable characteristics of the heating current of the detector element, such as for example its average value.

It is known that in the application of this principle, the value of the quantity to be measured is bound-up with the ratio of the power dissipated in the two thermosensitive elements.

These ratios are strictly independent of the working temperature of the thermosensitive elements and of the parasitic parameters such as the ambient temperature of the medium.

The known circuits which embody this principle, known as equi-temperature circuits, are complicated and the stability of their operation presents problems which are difficult to resolve in a simple manner.

The present invention is directed to the provision of a method of the kind referred to above, in which the embodiment and the application of the method are simple.

The present invention relates to a method of measurement of the kind referred to above which is characterized in that it consists:

of continuously supplying the compensating thermosensitive element with a direct current, hereinafter known as the reference current, the intensity of which is regulated to a value such that the compensating thermosensitive element has a temperature higher than that of the medium in which it is immersed;

of supplying the thermosensitive detector element with square direct current waves, hereinafter termed the measuring current, having an intensity regulated to a value greater than that of the intensity of the said reference current, and separated by intervals of time of predetermined duration, hereinafter known as the cooling period;

of regulating the duration of the square measuring current waves in such manner that the resistance of the thermosensitive detector element has the same value as that of the thermosensitive compensating element;

and of taking as the representative value of the characteristic quantity to be measured, the value of one of the variable characteristics of the measuring current.

In a preferred form, the method according to the invention consists:

of continuously supplying the thermosensitive compensation element with a direct heating current having an intensity regulated to a reference value I;

of supplying the thermosensitive detector element with a direct heating current having an intensity regulated to a value nI which is greater than I;

of dividing by n the voltage at the terminals of the detector element;

of comparing the voltage at the terminals of the thermosensitive compensating element with the nth part of the voltage at the terminals of the thermosensitive detector element;

of interrupting for a predetermined period (or cooling period) the circulation of the heating current of the thermosensitive detector element as soon as the said nth part of the voltage at the terminals of the thermosensitive detector element is equal to the voltage at the terminals of the thermosensitive compensating element, whereby the heating current of the thermosensitive detector element is cut-up into square waves;

and of taking as the representative value of the parameter to be measured, one of the variable characteristics of the heating current of the thermosensitive detector element.

In accordance with other characteristic features:

the cooling period is invariable, or the cooling period varies in inverse proportion to the frequency of recurrence of the said square waves of the measuring current or to the mean value of the measuring current;

the representative value of the quantity measured is the frequency of recurrence of the square waves of the measuring current, or the representative value of the quantity measured is the mean value of the measuring current.

The present invention also relates to apparatus for carrying into effect the method as defined above.

In a general way, the devices for carrying into effect the method according to the invention are characterized by the following points taken in combination:

the thermosensitive compensating element is continuously connected to a source of direct current having its intensity regulated to a so-called reference value;

the thermosensitive detector element is connected intermittently to a source of direct measuring current having an intensity regulated to a value greater than that of the reference current, by means of a releasable switch device;

means are provided for comparing the resistance of the detector element with the resistance of the compensating element;

means are provided for actuating the said switch device in such manner that, successively, it opens during a predetermined cooling period the supply circuit of the detector element, at the moment when the resistance of the detector element is equal to that of the compensating element, and then it closes the said supply circuit of the detector element, whereby the measuring current is cut-up into flattop waves;

and means are provided for measuring the frequency of recurrence of the said flattop waves of the measuring current and/or the mean intensity of the said measuring current.

According to one form of embodiment:

the compensating element is continuously connected to a source of direct reference current having its intensity regulated to a value I;

the detector element is connected intermittently to a source of direct measuring current having its intensity regulated to a value of $nI$ greater than I, by means of a releasable switch device;

means are provided for dividing by $n$ the voltage at the terminals of the detector element;

means are provided for comparing the voltage at the terminals of the compensating element with the $n$th part of the voltage at the terminals of the detector element;

means are provided for actuating the said switch device in such manner as successively to open, for a predetermined cooling period, the supply circuit of the detector element at the moment when the $n$th part of the voltage at the terminals of the detector element is equal to the voltage at the terminals of the compensating element, and then to reclose the said supply circuit of the detector element, whereby the measuring current is cut-up into square waves;

and means are provided for measuring the frequency of recurrence of the said square waves of the measuring current and/or the average intensity of the said measuring current.

In accordance with one preferred form of embodiment:

the releasable switch device is a transistor switch, the emitter-collector circuit of which is connected in series with the detector element;

the means for comparing the voltage at the terminals of the compensating element and the $n$th part of the voltage at the terminals of the detector element are constituted, on the one hand by a voltage-dividing bridge having a voltage ratio $n$ connected to the terminals of the detector filament and on the other hand by a voltage-comparison device;

and the means for actuating the above-mentioned transistor switch are constituted by multivibrator circuits, in which the duration of one of the half-periods is regulated by the output signal of the said comparison device, and in which the duration of the other half-period is either fixed or variable in inverse ratio to the frequency of recurrence of the square measuring waves or to the average valve of the measuring current.

According to a preferred characteristic feature, the multivibrator circuit is a self-oscillating multivibrator.

One of the advantageous applications of the present invention is that which can be employed in connection with thermistor anemometers or hot-wire anemometers.

By way of new industrial products, the invention is also concerned with the apparatus equipped with devices for carrying into effect the method specified above, and in particular thermistor anemometers and hot-wire anemometers.

The present invention will be more clearly understood by referring to the description which follows below, reference being made to the accompanying drawings, in which.

In the description which follows, it is obvious that there will be described only those elements necessary for the comprehension of the present invention.

Figure 1:
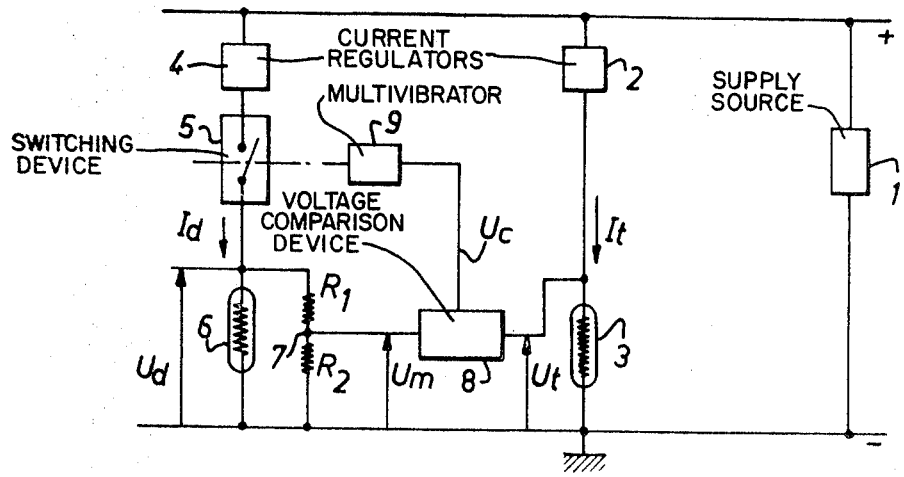
FIG. 1 is a synoptic diagram of the equipment for carrying into effect the method according to the invention.

In FIG. 1, which represents the synoptic diagram of the equipment for carrying into effect the method according to the invention, and in FIG. which shows, by way of nonlimitative example, one form of embodiment of the said equipment, there can be distinguished two circuits connected in parallel to the terminals of a common supply source 1.

Figure 2:
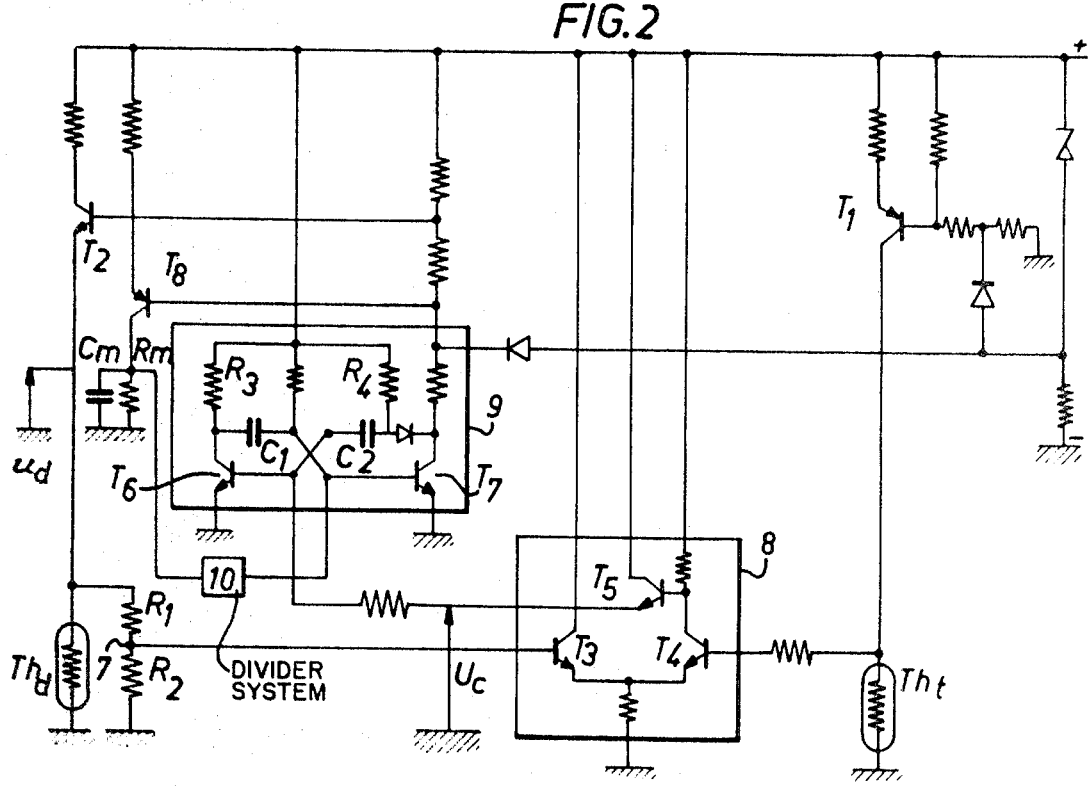
FIG. 2 shows by way of example and without implied limitation, the basic diagram of a thermistor anemometer which carries into effect the method according to the invention.

The first circuit comprises the series connection of a current regulator 2 and a thermosensitive element 3. In FIG. 2, the current regulator 2 is constituted by the transistor $T_1$, while the thermosensitive element 3 is the thermistor $Th_t$.

The second circuit comprises the connection in series of a current regulator 4, a switching device 5 and a thermosensitive element 6. In fIG. 2, the current regulator 4 and the switching device 5 are constituted by the transistor $T_2$, while the thermosensitive element 6 is the thermistor $Th_d$.

The current regulators 2 and 4 are set in such manner that the thermosensitive element 3 is continuously traversed by a constant current of intensity $I_t$, while the thermosensitive element 6 is traversed, when the switch 5 is closed, by a current having an intensity regulated to the value $I_d=nI_t>I_t$.

A divider bridge, constituted by the resistances $R_1$ and $R_2$ having a common point 7, is connected across the terminals of the thermosensitive element 6.

The values of $R_1$ and $R_2$ are such that the voltage $U_m$ appearing at the terminals of the resistance $R_2$ is equal to the $n$th part of the voltage $U_d$ appearing across the terminals of the thermosensitive element 6.

The voltage $U_m = U_d/n$ is applied to one of the inputs of a voltage comparison device 8, while the voltage $U_t$ appearing at the terminals of the thermosensitive element 3 is applied to the other input of the comparator 8 which is built around the transistor $T_3$, $T_4$ and $T_5$.

The output voltage $U_c$ of the comparator controls the operation of a multivibrator 9. This latter, shown in FIG. 2 in the form of a self-oscillating multivibrator, controls the operation of the switching device 5 (Transistor $T_2$ of FIG. 2).

In the text which follows, the thermosensitive compensator element $Th_t$ is known as a "pilot thermistor" and the thermosensitive detector element $Th_d$ is known as the "detector thermistor," the resistance while hot of $Th_t$ being given the reference $R_t$, the resistance when cold of $Th_d$ being represented by $R_{df}$ and the hot resistance of $Th_d$ being represented by $R_d$.

The pilot thermistor $Th_t$ being continuously heated, the voltage at its terminals reaches the value $U_t=RI_t$ depending on the value of the temperature of the atmosphere in which the pilot thermistor is immersed.

Figure 3:
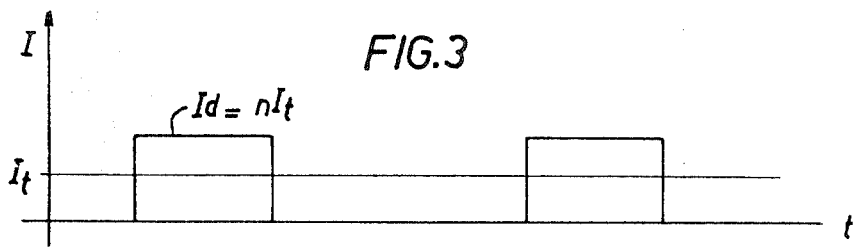
FIGS. 3 to 5 are curves representing the currents and voltages available at certain points of the apparatus described.
Figure 4:
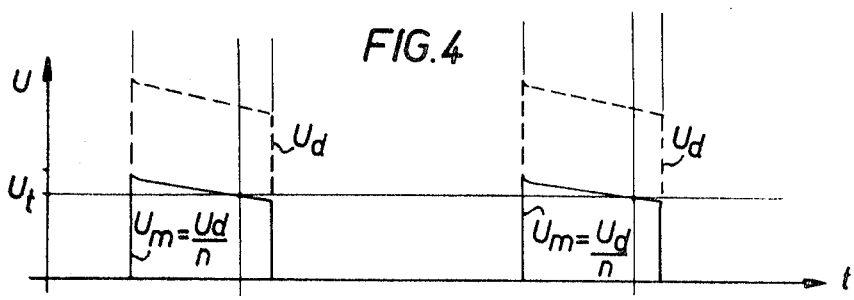
Figure 5:
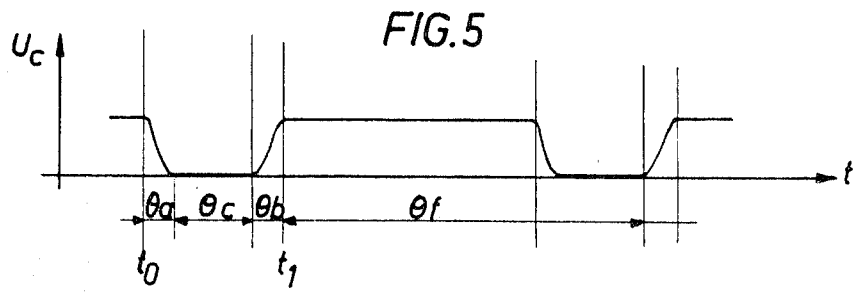

According to the invention, the detector thermistor $Th_d$ is subjected to successive phases of heating and cooling, the rhythm of which is determined by the comparator device 8 and the multivibrator 9. If the instant at which the heating phase starts is represented by $t_o$:

1. At the instant preceding the instant $t_o$ (see FIGS. 3 to 5):

the transistor $T_6$ of the multivibrator 9 is in the conducting state;

the transistor $T_7$ of the multivibrator 9 is in the nonconducting or blocked state;

the regulator-switch transistor $T_2$ is in the blocked condition;

it follows that no current passes through $Th_d$ and that the output transistor $T_5$ of the comparator 8 is in the saturated state;

it also follows that the value of the resistance $R_{df}$ of $Th_d$ is greater than the value $R_t$ of $Th_t$: $R_{df}>R_t$ (1).

2. At the instant $t_o$:

the transistor $T_6$ changes to the blocked state;

the transistor $T_7$ changes to the conducting state, causing the transistor $T_2$ to become conducting;

the detector thermistor $Th_d$ is then traversed by the current $I_d=nI_t$;

the voltage $U_d$ then has the value: $U_d=nI_tR_{df}$;

the voltage $U_m=U_d/n=IAtR_{df}$ is higher than the voltage $U_t=I_tR_t$ since $R_{df}>R_t$ (see relation (1) in the previous paragraph).

It follows that the comparator changes its state and that the transistor $T_5$ comes into the blocked condition, in practice with a short delay $\theta_a$.

3. The current $I_d$ passing through $Th_d$ causes it to heat-up gradually with a corresponding reduction of the value of its resistance while hot $R_d$ and of the value of the voltage $U_m$.

4. When the value of $U_m$ has fallen to the value $U_t$, the comparator 8 again changes its state and the transistor $T_5$ returns to the saturated state after a short delay $\theta_b$, which simultaneously causes the triggering of the multivibrator 9 and the blocking of the transistor $T_2$ (instant $t_1$). The thermistor $Th_d$ then enters a fresh phase of cooling, the duration of which $\theta_f$ is determined by the time constant of the combination $C_1$–$R_3$.

It is clear that the evolution of the temperature of the thermistor $Th_d$, and therefore of the period $\theta_c$ of heating of $Th_d$, depend on the heat dissipation of $Th_d$ to the medium in which it is immersed.

The influence of the ambient temperature of the said medium is compensated by the value taken by $U_t$ which also depends on the ambient temperature.

In the case described, in which the detector thermistor is immersed in a gaseous medium in movement, for example a flow of air, the heat dissipation of $Th_d$ depends on the speed of movement of the medium.

The quantity representing the speed of the flow of air is therefore the period $\theta_c$ during which the detector thermistor is heated by the current $I_d = nI_t$.

The cooling period $\theta_f$ of the thermistor being invariable, the period $\theta = \theta_c + \theta_f$ also represents the speed of the flow of air.

It follows that the measurement of the speed of the flow of air is reduced to the measurement of one of the variable characteristics of the current $I_d$.

One of these variable characteristics is the frequency of recurrence of the square waves of the current $I_d$ or the frequency of recurrence of the multivibrator 9 which amounts to the same thing. In this case, the measurement of the speed of the flow of air is reduced to a measurement of frequency, which can be effected by any known means.

Another variable characteristic of the current $I_d$ is the value of its mean intensity:

$$i_d = nI_t \frac{\theta_c}{\theta_c + \theta_f}$$

This measurement can be carried out by means of an integrator unit $R_m$–$C_m$, connected on the upstream side of the switch-regulator transistor $T_2$ so as not to influence the value of the current $I_d$. As shown in FIG. 2, it is also possible to insert the circuit $R_m$–$C_m$ in the emitter-collector circuit of a transistor switch $T_8$ operating as a switch-regulator transistor for the current and controlled by the multivibrator 9, as is the transistor $T_2$, the voltage $U_d$ measured at the terminals of $R_m$–$C_m$ being taken as the quantity proportional to $I_f$.

The thermosensitive elements may be resistances with a positive temperature coefficient, such as metallic filaments heated by the Joule effect.

The only difference which results resides in the fact that the resistance when cold $R_{df}$ of the detector filament is then less than the resistance of the pilot filament while hot.

Figure 6:
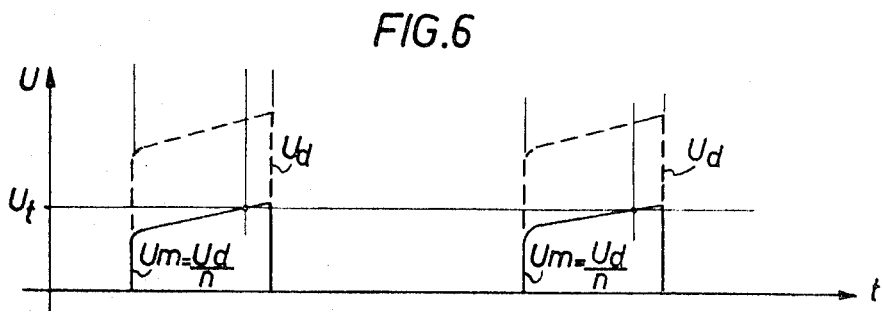
FIG. 6 is the curve representing the measuring current in a measuring apparatus with hot filaments.

It follows that, at the instant $t_o$, the voltage $U_m$ is less than the voltage $U_t$ (see FIG. 6).

The current $I_d$ causes gradual heating of the detector filament and a corresponding voltage $U_d$ and of the voltage $U_m$.

When the value of $U_m$ has reached the value of $U_t$, the comparator 8 causes the triggering of the multivibrator 9, the stopping of the circulation of $I_d$ and the cooling of the detector filament for a period determined by the multivibrator 9.

In the above description, it has been seen that the multivibrator 9 is of the self-oscillating or nonstable type, in which one of the half-periods determines the invariable duration of the cooling phase of $Th_d$, while the duration of the other half-period is determined by the operation of the comparator 8.

The nonstable multivibrator may be replaced by a monostable multivibrator (flip-flop), in which the period of the unstable state determines the duration of the cooling phase of $Th_d$, and in which the duration of the stable state is determined by the operation of the comparator 8.

The anemometer described in the foregoing text comprises two thermistors.

The detector thermistor is obviously placed in the flow of air, the speed of which is to be measured.

The pilot thermistor can be placed:
either in a place at which a part is at rest and free from turbulence;
or in a zone in which the flow of air has a speed proportional to but less than that of the zone in which the detector thermistor is mounted. In this latter case, it can be an advantage to adopt the arrangement described in French Pat. No. 1,557,134 of Dec. 29, 1967, filed by the present Applicants' assignee and in which a diaphragm of small thickness and provided with a circular orifice is arranged transversely to the flow of air, the speed of which is to be measured, the pilot thermistor and the detector thermistor being arranged symmetrically with respect to the said orifice and respectively on the upstream and downstream sides of the orifice.

In addition to the simplicity of its application, the method according to the present invention offers the advantage that it does not necessitate accurate matching of the thermosensitive elements.

Furthermore, the apparatus for carrying the method into effect have the advantage of being able to provide, either a voltage having an amplitude which varies analogically with the parameter to be measured and which is easy to linearize, or a frequency signal which is readily transmissible.

In this latter case, it may prove that the frequency corresponding to the range of values of the quantity to be measured is considered to be too large.

In view of the fact that it is possible to have simultaneously available the mean value of the square waves of heating current and of their frequency of recurrence, the frequency excursion can be regulated in the inverse ratio of the measured value of the frequency by controlling the duration of the half-period of the multivibrator which determines the period of cooling of the detector thermistor in the inverse ratio of the mean value of the measuring current.

In the example shown in FIG. 2, it is only necessary to regulate the polarization of the transistor $T_7$ by means of a fraction of the voltage at the terminals of the resistance $R_m$, the said fraction being advantageously adjusted by means of a divider system 10 with resistances and potentiometers, of any known type.

The method according to the invention, and the devices for carrying it into effect are applicable to all instruments which utilize the principle of measurement of temperature taken by the thermosensitive detector element as a function of the value of the quantity to be measured.

In particular, they are applicable to anemometers and thermometers, and also to gas-dosing instruments, whether they are of the type with catalytic combustion of the combustible gas to be dosed or whether they are of the type utilizing variation of the thermal conductivity of the medium surrounding the detector element.

We claim:
1. A method of measurement with a thermosensitive detector element immersed in a medium to be observed, and a second thermosensitive compensating element, the said method comprising the following steps:
supplying continuously a direct reference current to said thermosensitive compensating element;
regulation the intensity of said reference current to a value sufficient to ensure that the temperature of said thermosensitive compensating element is higher than the temperature of the medium in which said element is immersed;
supplying said thermosensitive detector element with a succession of square waves of a direct measuring current, separated from each other by intervals of cooling time;

regulating the intensity of said direct current square waves to a value greater than that of the intensity of said reference current;

regulating the duration of said square waves of measuring current so that the resistance of said thermosensitive detector element takes the same value as that of said thermosensitive compensating element;

and taking as the representative value of the characteristic quantity to be measured, the value of one of the variable characteristics of said measuring current.

2. A method of measurement as claimed in claim 1, in which:

said thermosensitive compensating element is continuously supplied with said reference current being a direct heating current having its intensity regulated to a reference value I;

said thermosensitive detector element is supplied with said direct measuring current also being a direct heating current having an intensity regulated to a value $nI$ which is greater than I;

the voltage at the terminals of said detector element is divided by $n$;

the voltage at the terminals of said thermosensitive compensating element is compared with the $n$th part of the voltage at the terminals of said thermosensitive detector element;

the circulation of the heating current of said thermosensitive detector element is interrupted for a predetermined period of cooling as soon as said $n$th part of the voltage at the terminals of said thermosensitive detector element is equal to the voltage at the terminals of said thermosensitive compensating element;

whereby the heating current of said thermosensitive detector element is cut-up into square waves;

and one of the variable characteristics of the heating current of said thermosensitive detector element is taken as the representative value of the parameter to be measured.

3. A method of measurement as claimed in claim 2, in which the period of cooling during which the circulation of the heating current of said thermosensitive detector element is interrupted, is invariable.

4. A method of measurement as claimed in claim 2, in which the period of cooling during which the circulation of the heating current of said thermosensitive detector element is interrupted, is varied in inverse ratio to the frequency of recurrence of said square waves of the heating current of said thermosensitive detector element.

5. A method of measurement as claimed in claim 2, in which the period of cooling during which the circulation of the heating current of said thermosensitive detector element is interrupted, is varied in inverse ratio to the mean value of said heating current of said thermosensitive detector element.

6. A method of measurement as claimed in claim 2, in which the mean value of the heating current of said thermosensitive detector element is taken as the representative value of the parameter to be measured.

7. A measuring device comprising in combination:

a thermosensitive compensating element continuously connected to a source of direct current;

means for regulating the intensity of said direct current to a reference value;

a thermosensitive detector element connected intermittently to a source of direct measuring current;

means for regulating the intensity of said direct measuring current to a value greater than that of said reference current;

a releasable switching device for intermittently connecting said thermosensitive detector element to said source of direct measuring current;

means for comparing the resistance of said detector element with the resistance of said compensating element;

means for actuating said releasable switching device, such that said switching device opens the supply circuit of said detector element for a predetermined cooling period, at the moment when the resistance of said detector element is equal to that of said compensating element, and then recloses the supply circuit of said detector element and cuts-up said measuring current into square waves;

and means for measuring a characteristic of said measuring current.

8. A measuring device as claimed in claim 7, in which:

said source of direct reference current to which said thermosensitive compensating element is continuously connected has an intensity regulated to a value I;

said direct measuring current to which said thermosensitive detector element is intermittently connected by means of a releasable switching device has an intensity regulated to a value $nI$ which is greater than I;

means are provided for dividing by $n$ the voltage at the terminals of said detector element;

means are provided for comparing the voltage at the terminals of said compensating element with the $n$th part of the voltage at the terminals of said detector element;

means are provided for actuating said releasable switching device so as successively to open for a predetermined period of cooling, the supply circuit of said detector element at the moment when the $n$th part of the voltage at the terminals of said detector element is equal to the voltage at the terminals of said compensating element, and then to reclose the supply circuit of said detector element;

whereby said measuring current is cut-up into square waves; and means are provided for measuring a characteristic of said measuring current.

9. A measuring device as claimed in claim 8, in which:

said releasable switching device is constituted by a transistor switch, the emitter-collector circuit of which is connected in series with said thermosensitive detector element;

the means for comparing the voltage at the terminals of said compensating element with the $n$th part of the voltage at the terminals of said detector element are constituted, on the one hand by a voltage-divider bridge with a ratio $n$ connected to the terminals of said detector element, and on the other hand by a voltage comparator device;

and the means for actuating said transistor switch are constituted by a multivibrator circuit, in which the duration of one of the half-periods is regulated by the output signal from said comparator device, and in which the duration of the other half-period is fixed.

10. A measuring device as claimed in claim 9, in which the duration of the second half-period of said multivibrator circuit is variable in inverse ratio to the frequency of recurrence of the square-top waves of said measuring current.

11. A measuring device as claimed in claim 9, in which the duration of the second half-period of said multivibrator circuit is variable in inverse ratio to the mean value of said measuring current.

12. A measuring device as claimed in claim 9, in which said multivibrator circuit is of the self-oscillating multivibrator type.

13. A measuring device as claimed in claim 7, in which:
said characteristic is the frequency of recurrence of said square measuring current waves.

14. A measuring device as claimed in claim 7, in which:
said characteristic is the mean intensity of said measuring current.

UNITED STATES PATENT OFFICE
CERTIFICATE OF CORRECTION

Patent No. 3,587,318            Dated June 28, 1971

Inventor(s) Pierre BELUGOU and Jean De CHAUMONT

It is certified that error appears in the above-identified patent and that said Letters Patent are hereby corrected as shown below:

In column 1, line 8, the priority date should read as follows:

Priority May 22, 1968.

Signed and sealed this 18th day of January 1972.

(SEAL)
Attest:

EDWARD M. FLETCHER, JR.      ROBERT GOTTSCHALK
Attesting Officer               Acting Commissioner of Patents